Figure 1:
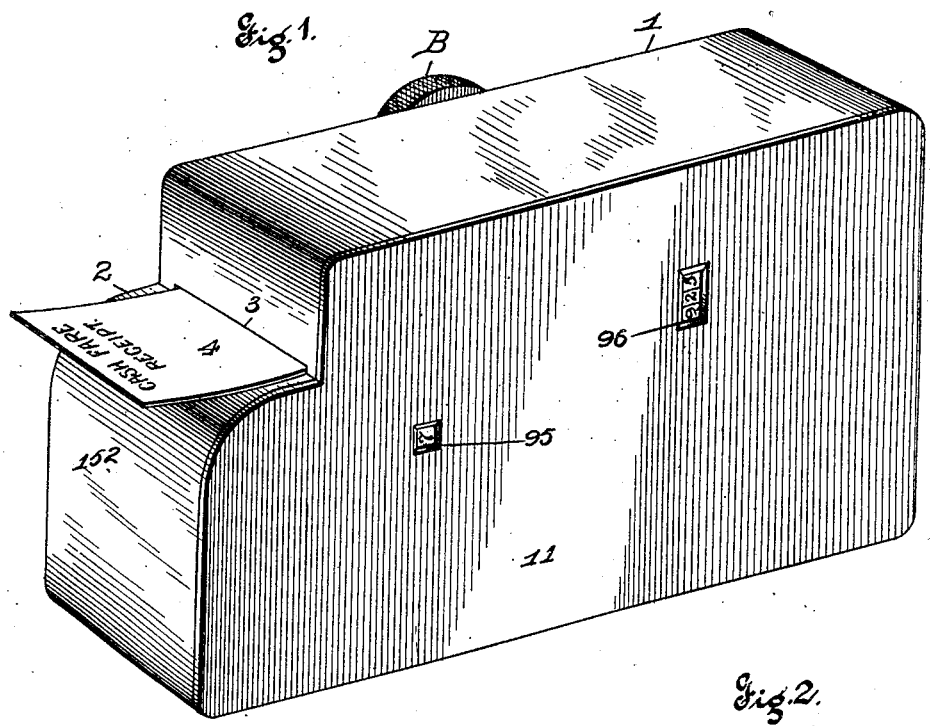

No. 809,377. PATENTED JAN. 9, 1906.
W. W. KAY.
CONDUCTOR'S CASH FARE RECEIPT REGISTER.
APPLICATION FILED NOV. 18, 1903.

7 SHEETS—SHEET 1.

Witnesses
Alfred A. Eicks

Inventor
William W. Kay
by Higdon & Longan & Hopkins attys

No. 809,377. PATENTED JAN. 9, 1906.
W. W. KAY.
CONDUCTOR'S CASH FARE RECEIPT REGISTER.
APPLICATION FILED NOV. 18, 1903.
7 SHEETS—SHEET 2.
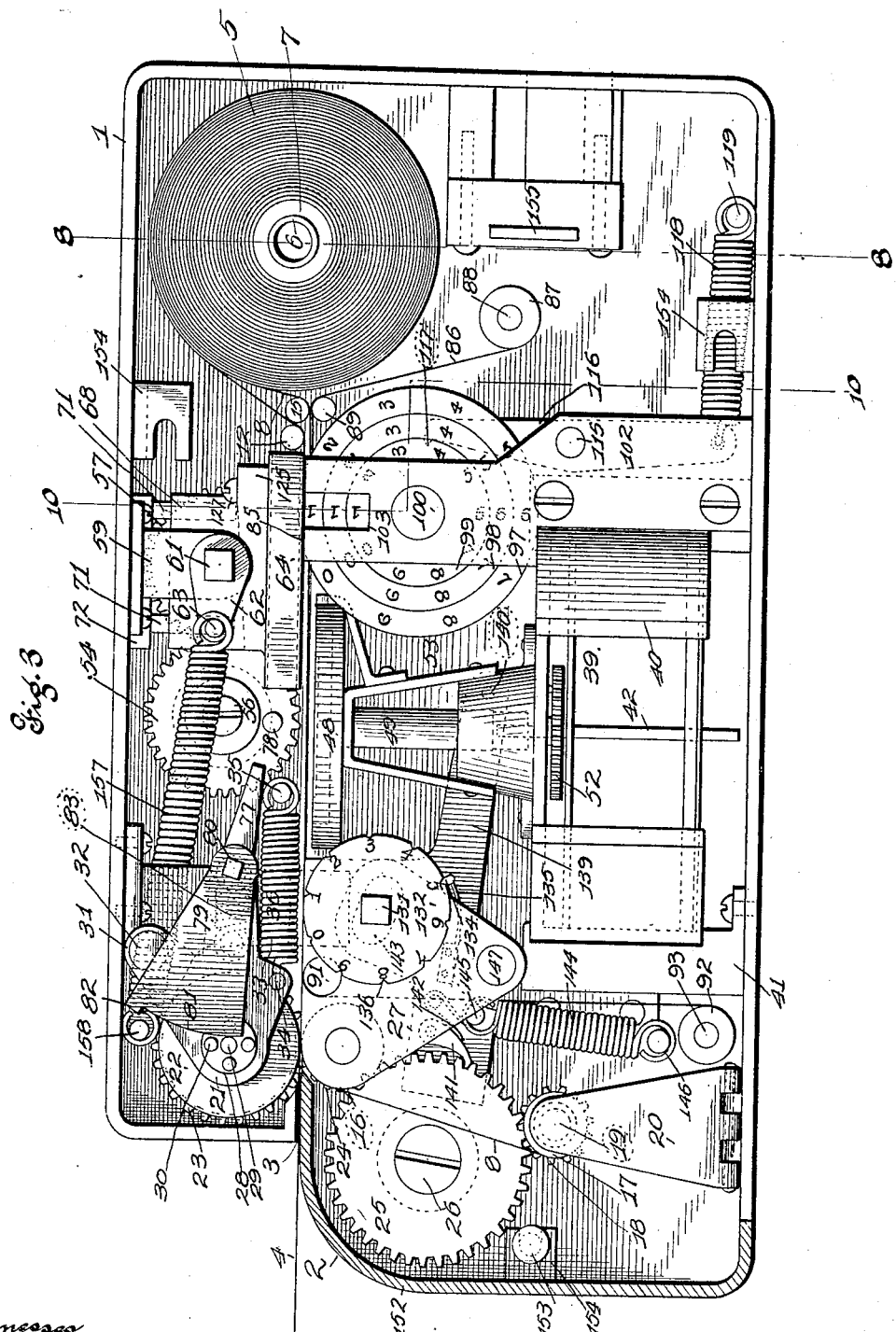
Witnesses
Alfred A. Ericks
W. S. Arion
Inventor
William W. Kay
by Higdon & Longan & Hopkins attys.

No. 809,377. PATENTED JAN. 9, 1906.
W. W. KAY.
CONDUCTOR'S CASH FARE RECEIPT REGISTER.
APPLICATION FILED NOV. 18, 1903.
7 SHEETS—SHEET 3.
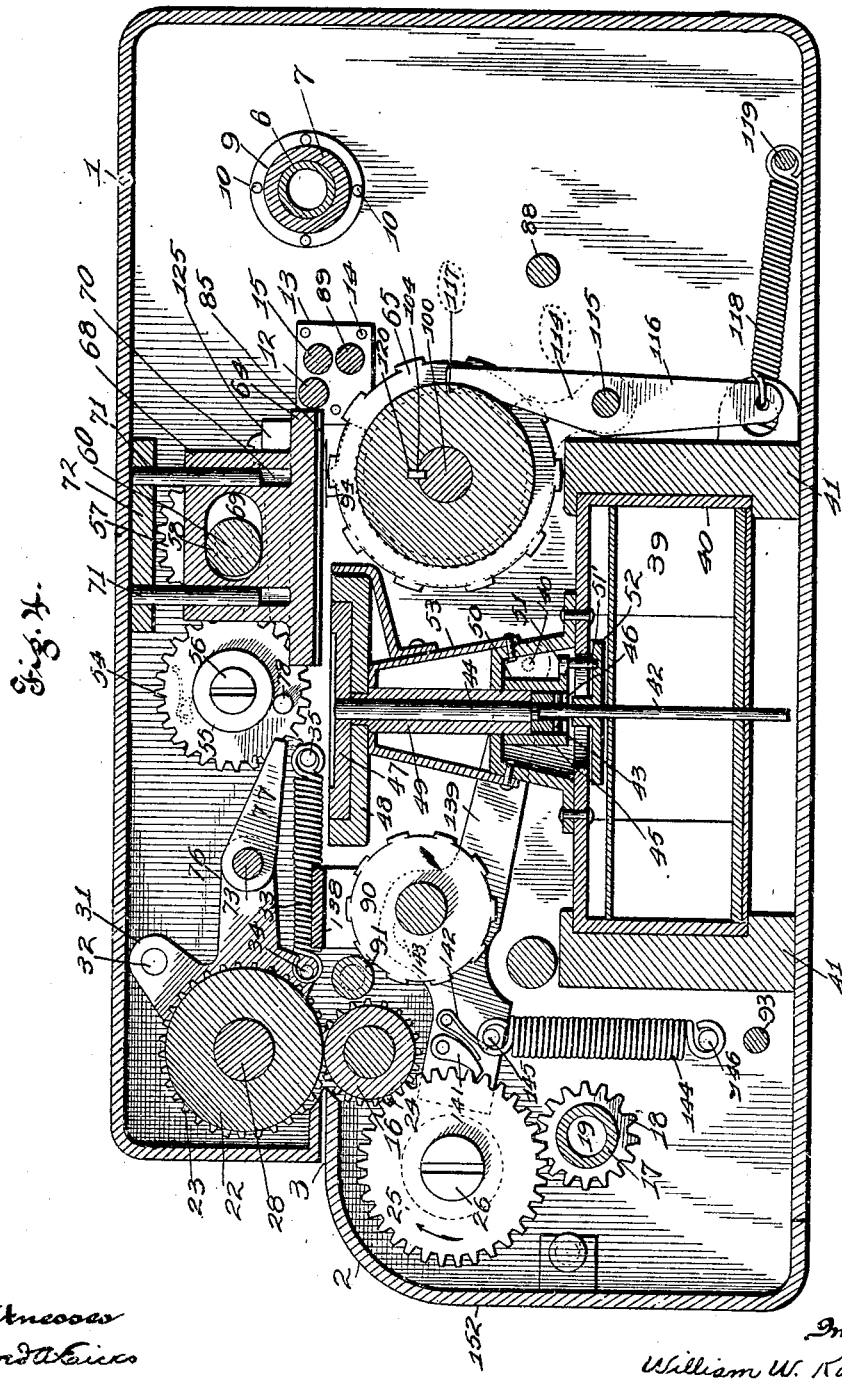
Witnesses
Alfred A. Ericks
M. F. Dixon
Inventor
William W. Kay
By Higdon & Longan & Hopkins Attys No. 809,377. PATENTED JAN. 9, 1906.
W. W. KAY.
CONDUCTOR'S CASH FARE RECEIPT REGISTER.
APPLICATION FILED NOV. 18, 1903.
7 SHEETS—SHEET 4.
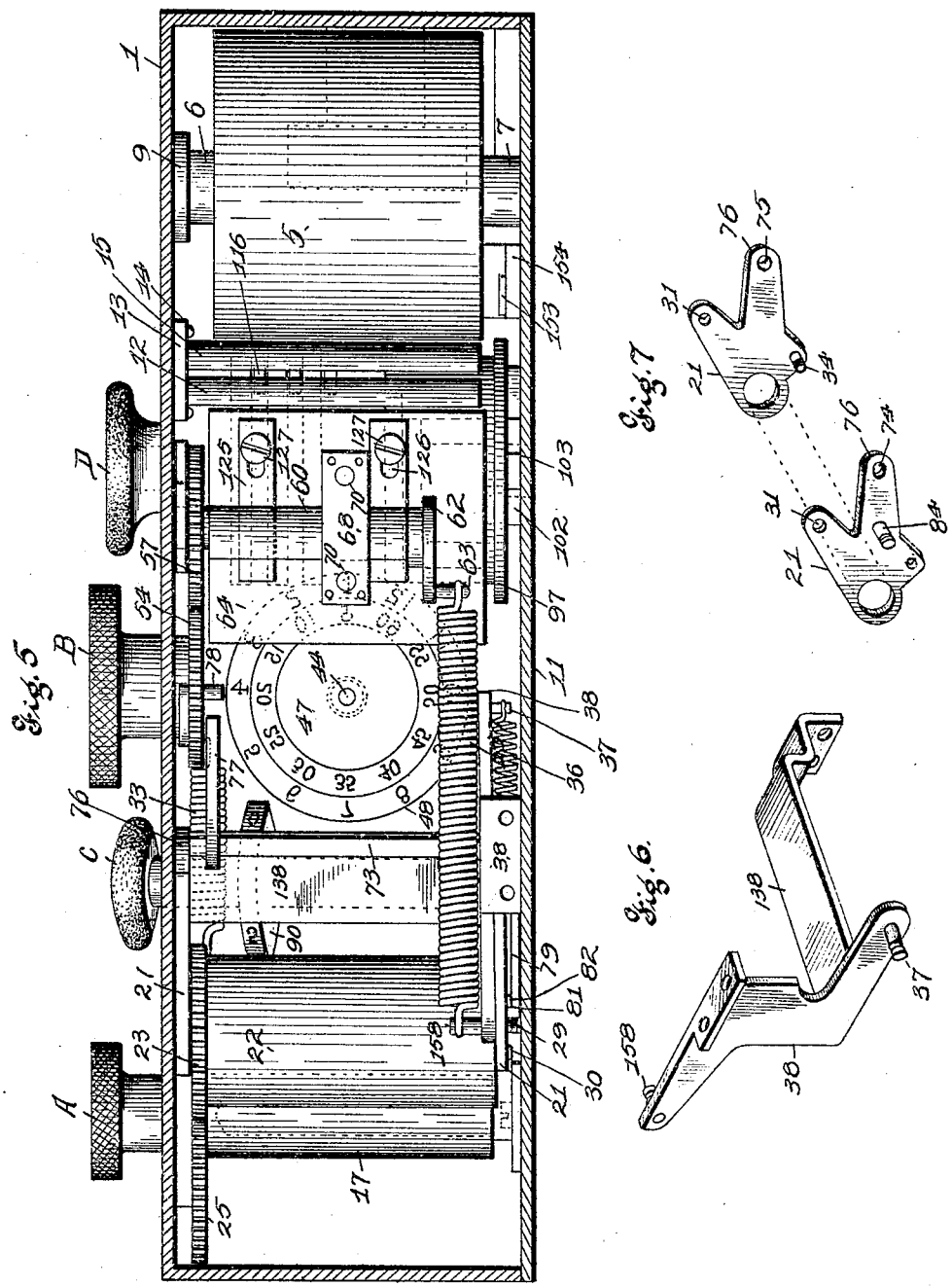
Witnesses
Alfred A. Eicks
M. S. Sriou
Inventor
William W. Kay
by Higdon & Longan & Hopkins Attys.

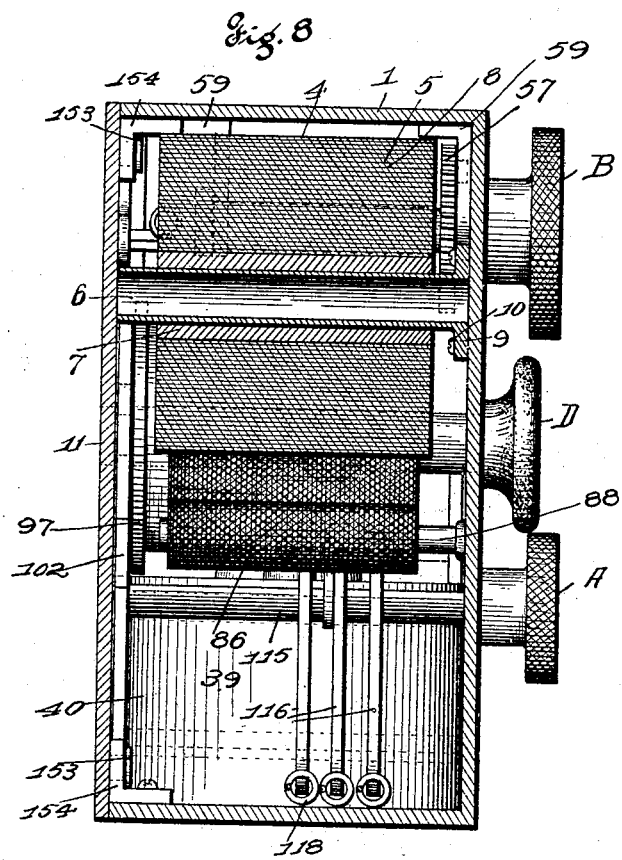

No. 809,377. PATENTED JAN. 9, 1906.
W. W. KAY.
CONDUCTOR'S CASH FARE RECEIPT REGISTER.
APPLICATION FILED NOV. 18, 1903.
7 SHEETS—SHEET 6.
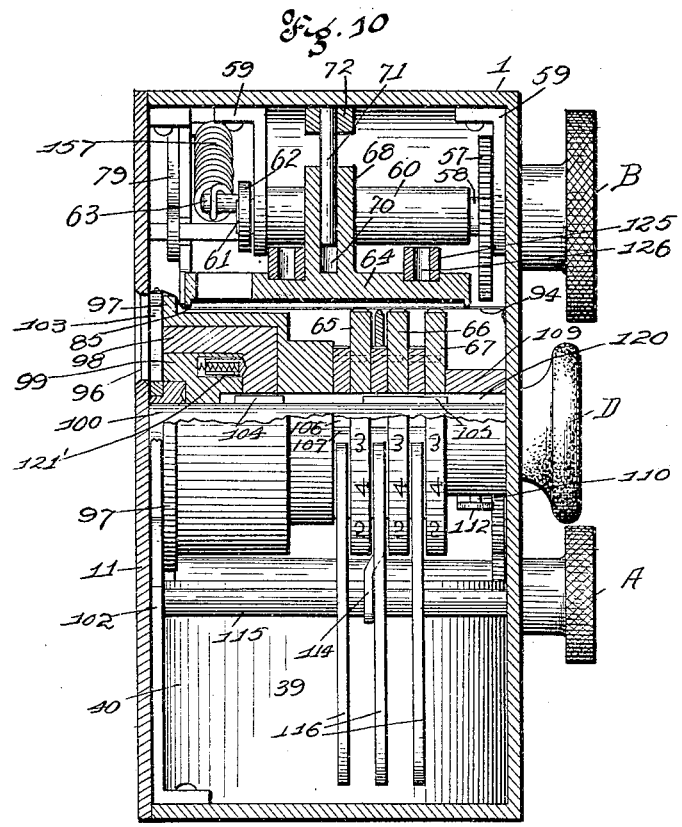
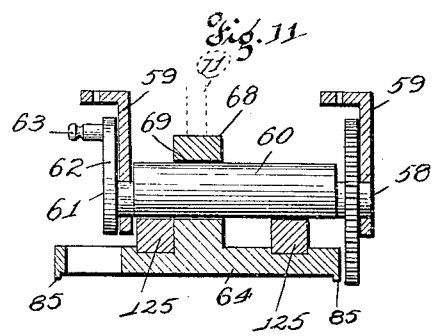
Witnesses
Inventor
William W. Kay No. 809,377. PATENTED JAN. 9, 1906.
W. W. KAY.
CONDUCTOR'S CASH FARE RECEIPT REGISTER.
APPLICATION FILED NOV. 18, 1903.
7 SHEETS—SHEET 7.
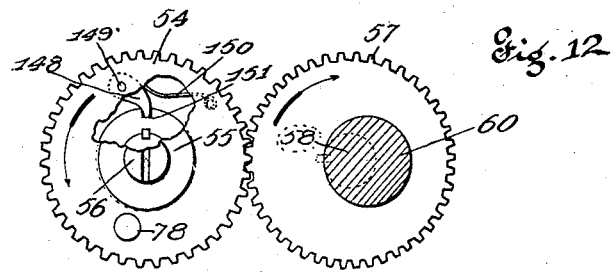
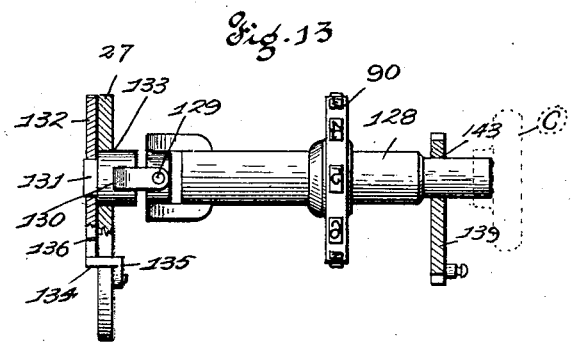
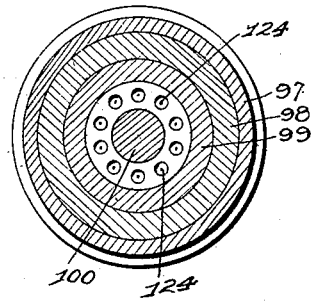
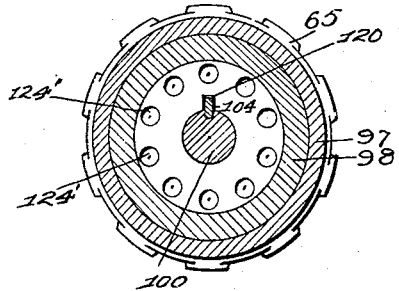
Witnesses
Alfred A. Eicks
M. S. Dixon
Inventor
William W. Kay
by Higdon & Longan & Hopkins attys

UNITED STATES PATENT OFFICE.

WILLIAM W. KAY, OF ST. LOUIS, MISSOURI.

CONDUCTOR'S CASH-FARE-RECEIPT REGISTER.

No. 809,377. Specification of Letters Patent. Patented Jan. 9, 1906.

Application filed November 18, 1903. Serial No. 181,669.

*To all whom it may concern:*

Be it known that I, WILLIAM W. KAY, a citizen of the United States, residing at St. Louis, State of Missouri, have invented certain new and useful Improvements in Conductors' Cash-Fare-Receipt Registers, of which the following is a specification containing a full, clear, and exact description, reference being had to the accompanying drawings, forming a part hereof.

My invention resides in a register, preferably of pocket size, to be carried by the conductors of railway cars or trains and from which they will issue to passengers receipts for cash fares paid to them by passengers.

The object of my invention is to provide a register which shall contain suitable mechanism whereby receipts may be issued therefrom and stamped or perforated with the time of issuance of said receipts, and which receipts shall also be stamped with the station-numbers or other means for identifying the stations to which the passenger's fare has been paid, whereby a check will be placed upon the actions of the conductors and they will be compelled to account for all cash received by them from passengers.

My invention consists of the novel construction, combination, and arrangement of parts hereinafter described and claimed.

Referring again to the drawings, it should be explained that the several views of my register show the same on a scale considerably larger than is necessary, and this enlargement is only done for the purpose of permitting the smaller parts of the instrument to be more easily seen and understood.

Figure 2:
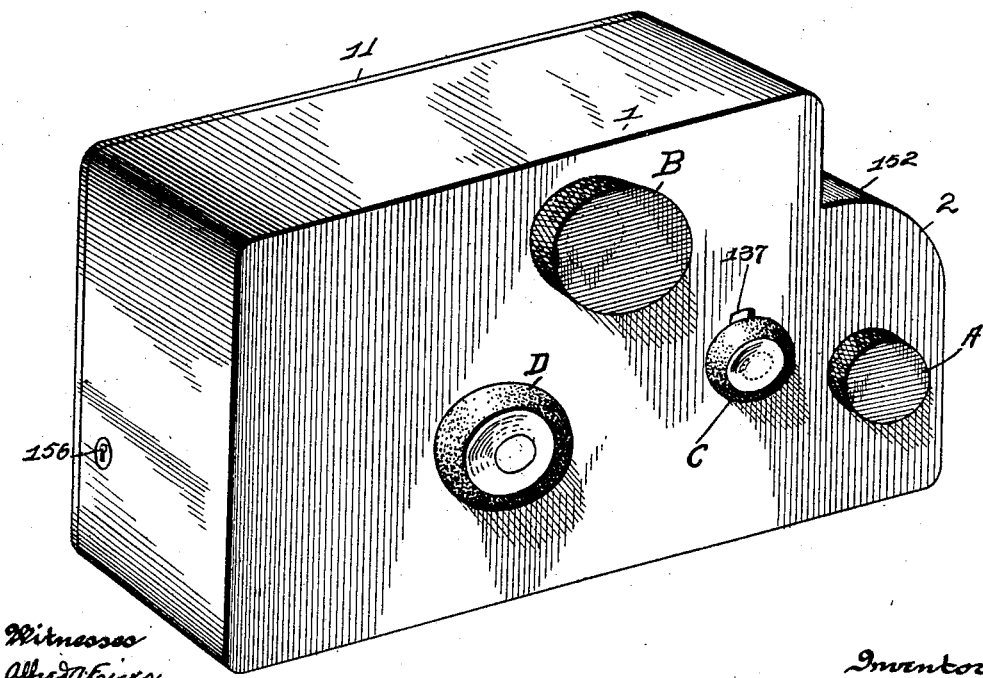

Figure 1 is a perspective view of a conductor's receipt-register embodying my invention. Fig. 2 is a perspective view of the same looking at the opposite side and end. Fig. 3 is a sectional side elevation with the cover removed. Fig. 4 is a sectional side elevation taken centrally. Fig. 5 is a sectional plan view, the top plate of the casing being removed by sectioning the vertical sides and ends of the casing near the top. Fig. 6 is a detail perspective view of a platen-frame. Fig. 7 is a detail perspective view of a pair of rocking feed-roll brackets. Fig. 8 is a transverse section on the line 8 8 of Fig. 3. Fig. 9 is a detail sectional view of the cash-fare-printing wheels, their indicating devices and operating connections. Fig. 10 is a transverse section through the machine, taken on the line 10 10 of Fig. 3. Fig. 11 is a detail sectional view of a reciprocating platen and its connections used in printing the cash receipts and also in printing the time. Fig. 12 is a detail sectional side elevation of the gearing for operating said platen. Fig. 13 is a detail sectional view of the station-printing wheel and its operative connections. Fig. 14 is a detail section taken on the line 14 14 of Fig. 9. Fig. 15 is a like section taken on the line 15 15 of Fig. 9.

1 indicates a casing, which should be of such size that it may be conveniently carried in the pocket or in some other location upon the conductor's person, and this casing is preferably rectangular in shape, but having a reduced extension 2 at one end and provided with an issue-slot 3 at the base of said extension, through which slot the original passenger's receipt is to be withdrawn and torn off of a continuous strip of paper 4, which is to be unwound from a roll 5, mounted at the opposite end of the casing upon a tubular mandrel 6, having the usual wood core 7. Said roll has also wound upon it another strip of paper 8, from which the duplicate copy of the receipt is to be made, and both strips are of course unwound simultaneously during operation of the machine. Said mandrel 6 is provided at one end with a flange 9, secured to one side of the casing by means of suitable rivets 10, so that the opposite end of said mandrel is free, and the roll of paper may be readily mounted thereon by inserting the mandrel in the opening of the roll-core 7 and then sliding said roll into position upon the mandrel. One side plate 11 of the casing 1 is removable, and in placing or removing the roll of paper said plate would of course have to be removed in order to expose the free end of said mandrel. The strip of paper 4 passes from the roll 5 beneath a suitable roller or bar 12, which is mounted at one end upon a plate 13, secured to the fixed side of the casing by means of rivets 14, and the opposite end of said bar is free and extends in a direction parallel to said mandrel 6. After passing beneath the guide-bar 12 the strip of paper 4 extends outwardly in a direct line to the issue-slot 3. The duplicate strip of paper 8 passes from the roll 5 beneath a guide-bar 15 and thence passes beneath the strip 4 and parallel therewith until near the issue-slot 3, when said duplicate strip passes over a feed-roll 16 and thence passes downwardly to a spool or roll 17, upon which it is to be rewound and preserved within the casing beyond the control of the conductor. Spool 17 is mounted on a shaft 19, which shaft is provided with a gear-wheel 18 on its inner end, the outer end of said shaft passing through the casing and being provided with a knob A. Said roll is held in position upon said shaft 19 by means of a hinged arm 20, which is pivoted at its lower end to the bottom of the casing and extends upwardly and bears against the outer end of said shaft to frictionally retain said roll upon the shaft 19. Yieldingly mounted between and carried by two feed-roll brackets 21 21 is a feed-roll 22, which with the previously-mentioned feed-roll 16 forms a pair of feed-rolls between which both strips of paper pass and by means of which they are fed. Said feed-roll 22 is driven by means of a gear-wheel 23, which meshes with a gear-wheel 24, carried by said feed-roll 16, and said last-mentioned gear-wheel meshes with and is driven by the larger gear-wheel 25, and the latter meshes with said gear-wheel 18 of the said shaft 19. Hereinafter I will refer to the roll 17 as a "record-roll." The large gear-wheel 25 is mounted upon a stud 26, secured to the inner vertical wall of the casing, and the feed-roll 16 and its gear-wheel are mounted between a triangular plate 27 and the inner vertical wall of the casing.

28 indicates the shaft of the yielding feed-roll 22, and said shaft projects at its outer end through its supporting-bracket 21 and has upon said projecting end a central pin 29, which acts as a friction-pulley, and it also has a series of four additional projecting pins 30, which are arranged in a rectangular position around said friction-pulley.

The feed-roll brackets 21 have parallel perforated upper arms 31, and said arms are pivotally mounted upon a stud 32, which projects from the vertical wall of the casing, so that when said brackets are moved upon said stud the upper feed-roll 22 will be moved toward or from the lower feed-roll 16, and thereby clamp or release the two strips of paper between said rolls. A coiled spring 33 has one of its ends fastened to a pin 34, projecting from one of said brackets 21 at a point some distance beneath the stud 32, and the opposite end of said spring is attached to a pin 35, projecting from the vertical wall of the casing, and the power of this spring is exerted to force the upper feed-roll 22 toward the lower feed-roll 16. Another spring 36, identical with the spring 33, has one of its ends connected to another pin 34 on the other bracket 21, and has its other end connected to a pin 37, projecting from a platen-frame 38, and the function and purpose of the last-mentioned spring is the same as that of the spring 33.

In order to prevent the conductor from withdrawing more than one receipt at a time without first making a record of the time of withdrawal thereof, I provide a time-recording device, which will now be described.

39 indicates a common clock-movement, which is contained within the casing 40 and supported upon suitable brackets 41, resting upon the bottom of the casing 1. Said clock-movement has the usual hour-hand shaft 42, which extends vertically above the clock-casing 40 and is provided thereat with a short cross-pin 43, the ends of which project in opposite directions at right angles to the axis of said shaft. 44 indicates an extension of said hour-hand shaft, which has upon its lower end an enlarged socket 45 for receiving the upper end of said hour-hand shaft. Diametrically-opposite recesses 46 are formed in the lower end of said socket, so that their walls fit over the projecting ends of said cross-pin, and the said shaft and its extension are thereby separably connected, and the extension may be detached by simply elevating it until said pin ends are removed from said recesses. Mounted upon the upper end of said hour-hand extension 44 and adapted to rotate therewith is a circular disk 47, having upon its upper face a series of numerals indicating minutes or fractions of an hour, and in the present instance these numerals begin with the numeral "5" and extend to the numeral "60." The numerals are preferably embossed, so as to form printing-type. 48 indicates another circular disk, which has upon its upper face numerals or other marks representing hours from "1" to "12," inclusive, and these marks are also preferably embossed to form printing-type and are arranged near the marginal edge of said disk and are arranged symmetrically upon radial lines corresponding to those upon which the numerals or marks of the disk 47 are located. The said disk 48 has a recess in its upper side in which the disk 47 is mounted, so that the faces of the printing-type of both disks lie in the same plane, thereby permitting both series of type to make simultaneous impressions during the printing operation. Said disk 48 is rotated by means of a sleeve 49, the upper end of which is rigidly connected to said disk, and which sleeve is mounted upon the hour-hand extension 44 and extends downwardly and has a socket 50 fixed upon its lower end, and this socket embraces the socket upon the lower end of the hour-shaft extension merely for the sake of compactness. Motion is communicated to said socket 50 and through it to the sleeve 49 and hour-disk 48 by means of an arm 51, projecting laterally from said socket 50 and provided at its outer end with a pin 51', which latter extends downwardly and enters a hole in a gear-wheel 52, which is to be driven by the clock-movement contained in the casing 40, said gear-wheel of course being loose upon the hour-shaft 42, although said shaft is shown passing through said wheel. The clock-movement is not shown.

53 indicates suitable braces mounted on top of the clock-casing, and they are to support the time-printing disks 47 and 48 and form bearings for the sleeve 49 and the hour-shaft extension 44.

54 indicates a gear-wheel which is mounted upon a hub 55, which extends through the vertical wall of the casing 1 and carries a knob B, by means of which said wheel may be turned to accomplish the printing operation. Said hub 55 and its knob are preferably formed in two pieces and separably connected by means of a screw 56. Said gear-wheel 54 meshes with another gear-wheel 57, which latter is fixed upon one end of a horizontal shaft 58, which has its bearings in the depending brackets 59, secured by screws to the top of the casing. Said shaft 58 is provided with an eccentric cam 60, and one of its ends is squared at 61, and a crank 62 is fixed upon said squared portion. 63 indicates a crank-pin projecting from said crank.

64 indicates a movable platen, which is preferably rectangular in shape and of such size as to extend over the printing-point of the disks 47 and 48 and also over the printing-point of a series of type-wheels 65, 66, and 67, which latter are used in printing the amount of cash fare received from each passenger and which will be described further on. Upon the upper side of the said platen is a shank 68, in which is formed a horizontal slot 69, in which the eccentric cam 60 rotates. Vertical guide-recesses 70 are also formed in said shank, and guide-pins 71 project downwardly from a bracket 72 and project into said guide-recesses 70 for the purpose of guiding said platen during vertical movement thereof. The feed-roll 22 is provided with a locking mechanism, whereby the same will be locked after a proper length of paper strip has been fed outwardly to form a single receipt, and said feed-roll cannot be released until the conductor prints the time upon the paper strip for the next succeeding receipt. 73 indicates a rock-shaft which is mounted in the perforations 74 and 75 of the longer arms 76 of the feed-roll brackets 21, (see Fig. 5,) and said shaft has fixed upon it near one end an arm 77, which after a receipt is passed through the feed-rolls 16 and 22 will be elevated into the path of a pin 78. I would explain that the depression of the platen 64 for an extended time would unduly retard and interfere with the accurate running of the clock, and for this reason I have provided the said eccentric cam 60 and suitable connections, which will permit only a momentary depression of said platen. This will be described more fully later on. The depression of the platen can only be accomplished by turning the time-printing knob B and its gear-wheel 54 in the direction indicated by the arrow in Fig. 12. Said arm 77 is elevated by a friction-sector 79, which is fixed upon a squared portion 80 of said shaft 73 and which is provided at its larger end with a curved friction-surface 81, which is forced into contact with the small friction-pulley 29 of the feed-roll shaft 28, so that when said shaft is rotated in feeding the paper said pulley will engage said friction-surface of said sector and depress the large end of said sector, and thereby move said shaft 73 and elevate said arm 77 a corresponding distance. After the proper length of paper for a receipt is passed between the feed-rolls a projecting lug 82 at the upper end of said friction-surface will contact with said friction-pulley 28, and thereby stop the downward movement of said sector. Said lug 82 also projects laterally and prevents the further rotation of the feed-roll 22 by contact of said lug with one of the series of short projecting pins 30, which are arranged about said friction-pulley, as previously described. (See Fig. 5.) Said sector is urged into contact with said friction-pulley by means of a short spring 83, as shown in dotted lines in Fig. 3, one end of said spring being fixed to said shaft 73 and the opposite end attached to a pin 84, projecting from one of the feed-roll brackets 21. Relative movement of said shaft in its bearings in said feed-roll bracket-arms 76 is permitted by reason of the fact that the perforation 74, forming the bearing for said shaft next adjacent said sector, is elongated, as shown in Fig. 7.

The platen 64 has opposite guide-flanges 85 projecting from its face in order to guide the paper as it passes beneath said platen.

86 indicates an ink-ribbon which is wound upon a suitable spool 87, mounted upon a pin or stud 88 beneath the paper-roll 5, and which ribbon passes upwardly and over the small bar 89, located directly beneath the bar 15, and thence said ribbon passes beneath the duplicate paper strip 8 and the platen 64, above the time-printing disks 47 48, above the station-number type-wheel 90, and thence said ribbon passes over the bar or roll 91, and thence to a spool 92, which is mounted upon a pin 93. Said ribbon is to be rewound upon said spool 92; but I have not shown any means for actuating said spool, and the same may be actuated by hand or any common means heretofore in use upon type-writing machines or similar devices well known in the art.

I have purposely refrained from placing the ink-ribbon 86 between the original and duplicate strips of paper in order to prevent the conductor from inspecting the time-record which he makes by the use of the instrument, and the original will therefore issue without any time-record upon it, the time being printed only upon the duplicate strip and retained in the machine. Nothing but the amount is printed upon the under side of the original strip, except, perhaps, some instructions to passengers or conductors. The name of the railway company and the words "Cash-fare receipt" may be printed upon the upper side of the original, if so desired, as indicated in Fig. 1. However, it is of course not necessary that anything be printed upon the upper side of the strips.

94 indicates a short ribbon extending transversely of the machine between the platen 64 and the cash-printing wheels 65 66 67, as shown in Fig. 10; but said ribbon is located directly beneath the original paper strip 4 and between the same and the duplicate strip 8, so that a cash record and no other will be printed upon the under surface of said original strip.

It is essential that the conductor be provided with means for indicating the position of the type upon the station-printing wheel 90 and the cash-printing wheels 65 66 67 prior to making a record with them, and for this purpose I provide in the removable side plate 11 of the casing 2 sight-openings 95 96, of which the opening 95 is what I term the "station-opening" and the opening 96 the "cash-opening." I will first describe the construction of the cash-indicator. It consists of a series of annular nested cups 97 98 99, which have upon their outer free edges a series of numerals representing dollars and cents and in the present instance being, as shown in Fig. 3, from "000" to "999," the numerals upon the inner cup 99 representing dollars and those on the two remaining cups representing fractions of a dollar. When a series of numerals upon the various cups is in alinement, they may be brought into the rear of the cash sight-opening 96 and will be visible therethrough.

The details of construction of the cash-printing wheels and indicating-cups are shown in Fig. 9. These devices are manipulated by means of the cash-knob D, which is fixed upon the outer end of a sliding shaft 100, that has a bearing at one end in the fixed wall of the casing 1 and at the opposite end in a nipple 101, screwed within an opening formed in the frame-standard 102. Said nipple is fixed; but all the remaining devices which are mounted upon said shaft 100 are rotatable with said shaft. There is also a sight-opening 103 formed in said frame-standard and registering with the sight-opening in the removable side plate. Said shaft 100 is provided with two feathers 104 105, which are spaced such a distance apart as that the feather 104 will engage and operate the cash-indicating cups 97 98 99 either simultaneously or separately and that the feather 105 will engage and operate the corresponding cash type-wheels 65 66 67. The said cash type-wheels are separated from each other and from the adjacent indicating-cup 97 by means of a series of interposed flat disks 106, which are provided with a series of peripheral notches 107, corresponding in number to the number of type on the face of said type-wheels. The disk on the left-hand side of the type-wheels (shown in Fig. 9) is secured to the type-wheel at the right of it by means of suitable pins 108, or said parts may be formed integral, so that a disk will rotate with each type-wheel. Also mounted upon said shaft 100, between the series of type-wheels 65 66 67 and the casing 1, is a collar 109, which is provided with a spring-pin 110, the inner end of which is pointed and is adapted to seat within any one of a series of three depressions 111, which latter are formed in said shaft in alinement with each other and parallel to the axis of said shaft. Said spring-pin is yieldingly retained in the depression in which it may be located by means of a flat curved spring 112, which has one end secured to the outer end of said pin and its opposite end secured upon the periphery of said collar 109 by means of a screw or rivet 113. 114 indicates a period or decimal point which is in the form of a curved bar having a type at its upper portion, and which bar is curved and passes around the notched disk which is located between the type-wheels 65 66 so that the lower portion of said bar projects downwardly a considerable distance below said type-wheels. The lower end of said bar is provided with a perforation, by means of which the bar is mounted upon a transverse shaft 115. Fulcrumed upon said shaft 115 at a point about midway of their length are three retaining-dogs 116, the upper ends of which are provided with lateral points 117, which are adapted to engage the notches in said notched disks 106. The lateral points of said disks are retained in said notches by means of three springs 118, which draw the lower ends of said dogs in an opposite direction. Said springs have their outer ends attached to a horizontal bar 119, extending across the casing near the bottom thereof, and the opposite ends of said springs are secured to said dogs. All the parts which are mounted upon said shaft 100 are provided with keyways 120, which are adapted to be placed in alinement, and thereby permit said feathers 104 105 to freely slide therein.

The indicating-cups 98 99 and the fixed nipple 101 are yieldingly connected by means of a series of hollow spring-bolts 121, each having a tubular shank and a pointed end. Mounted within said tubular shank is a spring 122, one end of which bears against the end of the bolt and the opposite end of which bears against the wall of a recess 123, formed within the cup and in which the spring-bolt is located. The pointed ends of said bolts engage in one of an annular series of depressions 124, formed in the opposing cup. Said spring-bolts and said depressions also act to retain the cups in position after they have been set to indicate any given amount of cash.

Referring again to the platen 64, 125 indicates wedges having slots 126 for the screws 127 and adjustably located on the upper side of the platen for the purpose of receiving the thrust of the eccentric cam 60. By manipulating said screws said wedges may be adjusted to take up the wear between said cam and themselves.

The station type-wheel 90 is fixed upon a shaft 128, (see Fig. 13,) which has the knob C upon its outer end, and said shaft is provided at its inner end with a common universal joint 129, by means of which it is flexibly connected to an extension 130, having a squared end 131, upon which is fixed a vertical station-indicating disk 132, having the numerals from "0" to "9," inclusive, upon its outer face and which are separately visible at the station sight-opening 95 when said disk is moved. Said extension 130 has a bearing 133 in the triangular plate 27. 134 indicates a detent which is provided with a spring 135, one end of which is fixed by rivets to the inner face of said triangular plate and is adapted to urge said detent into symmetrically-arranged recesses 136, formed in the periphery of said station-indicating disk 132 for the purpose of yieldingly holding said disk and the parts with which it is connected in any desired adjustment with relation to said sight-opening 95. Said shaft 128 projects through a vertical slot 137, (see Fig. 2,) so that the outer end of said shaft may be vibrated vertically, and thereby move the station type-wheel 90 into and out of contact with the ribbon 86 in order to print the number of the station upon the duplicate paper strip 8. The impression made by the said type-wheel will of course be received by the transverse fixed platen 138, which is carried by the platen-frame 38. (See Fig. 6.) Said platen-frame is secured in position by means of suitable screws or rivets, some of which engage the top of the casing and others the side thereof.

For feeding the paper strip step by step in order to make a space between each impression of the type carried by said type-wheel 90 I provide a feed mechanism, which will now be described.

139 indicates an arm pivoted at its inner end to the casing or some fixed part of the device by means of a screw or rivet 140, (see Fig. 3,) and the said arm extends at an angle toward the delivery end of the machine, and its outer end is provided with a pawl 141, which is urged into contact with the teeth of the gear-wheel 25 by means of a spring 142. Projecting from the upper edge of said arm is a lateral extension having an inclined slot 143, through which the station-type-wheel shaft 128 passes, so that when said shaft is vibrated said arm will also be vibrated upon its pivotal point and cause said pawl 141 to move said gear-wheel 25 step by step, and this will in turn of course move the feed-rolls 16 and 22. The walls of said inclined slot 143 form stops to limit the movement of said arm 139. The movement of the type-wheel shaft 128 is limited by the vertical dimensions of the slot 137 in the casing, so that the paper will be fed a proper distance at each stroke of said shaft. Said arm 139 is normally depressed by means of a spring 144, one end of which is connected to said arm by means of a pin 145, and the opposite end of which is secured to a pin 146, projecting from the casing 1.

147 indicates a stud for supporting the triangular plate 27.

Before proceeding with the operation I will describe in detail the construction of a spring-dog connection between the gear-wheel 54 and its knob B, used in causing a momentary depression on the platen 64 in printing the cash and time records. Said wheel 54 is loosely mounted to rotate upon its hub 55 and may turn freely in the direction indicated by the arrow shown upon said wheel in Fig. 12 without movement of said hub or knob, and when said wheel is to be turned in the direction of said arrow said hub and said wheel will be locked together by means of a spring-dog 148, which is pivoted at 149 to said wheel and provided with a spring 150, which latter urges the free end of said dog into a depression 151, formed in the said hub.

I do not limit myself to the exact construction of parts herein shown and described, as it is obvious that such construction may be changed within the limits of skill possessed by expert workmen without departing from the spirit and scope of my invention.

The removable side plate 11 has the end and top 152 of the extension 2 formed integral with said plate, so that in removing the latter said part 152 will also be removed. The removable side plate 11 is held in position by means of headed pins 153, projecting from the inner face of said plate and engaging slotted brackets 154, fixed to the stationary parts of the casing. It will be thus understood that the said plate 11 may be removed by first sliding it slightly to the left hand of Fig. 3 and then separating it from the casing. In replacing the said plate it will only be necessary to reverse such movement. The removal of said plate will disclose the entire mechanism. The said plate should of course be securely locked in position, so as to prevent tampering with the mechanism contained within the casing. For this purpose I have shown a common lock provided with a bolt 155, adapted to be projected within a recess or behind a projection carried by said removable plate, and thereby prevent the inward movement of said plate, which is necessary in order to detach the headed pins 153 from said slotted brackets 154. Said lock is operated by means of a common key to be inserted through a keyhole 156.

The operation is as follows: The machine is handed to the conductor with the clock wound and set at the correct time and with the paper strips in proper position for use. In the manufacture of the paper strips the duplicate strip should be provided with a margin on its outer end of sufficient length to permit of its end being brought down and attached to the record-roll, which will leave the first duplicate receipt in the proper position to receive the imprint of the amount, time, and station-numbers of the first receipt issued. It may be necessary to remove the record which has been accumulated on the record-roll 17 before all the receipts contained in roll 5 have been exhausted, and as there is no space between the several duplicate receipts it will be necessary to attach an extension to the paper strip, which can then be attached to the record-roll as before. Pieces of paper with one end gummed may be provided for the purpose. The margin above referred to and the substitute gummed strips may be utilized to record the name of the conductor, the number of the train, or any other records which it may be desirable to place thereon. The paper strip used for the original receipts is also in its proper place to receive the imprint of the amount of the first receipt issued and will pass from between the feed-rolls 16 and 22 to the edge of the opening 3. The conductor upon receiving a cash fare from any passenger should immediately issue to said passenger a receipt from the register for the amount of fare received; but in preparing this receipt the conductor will be compelled to print upon the duplicate record-strip 8 the amount of cash fare received from the passenger and also print upon the said duplicate the number of the station to which the fare is paid or the numbers of the two stations between which the fare is paid, as may be required. In addition to this the conductor will also be compelled to print upon said duplicate the exact time of issuing the receipt. If any discrepancy or error appears in the record, the conductor can of course be held accountable therefor. The movement of the clock mechanism is of course beyond the control of the conductor, as it is locked within the casing, so that he need pay no attention to the time of issuance of the receipts; but the time will be automatically printed upon the duplicate strip of paper by the momentary depression of the platen 64, which the conductor must necessarily bring about in printing the amount of cash fare received from a passenger. In printing the amount of cash received from the passenger the conductor will first see that the proper amount appears at the sight-opening 96, which may be accomplished by manipulating the cash-knob D in the following-described manner: In order to set the cash type-wheel 65 to print the dollars, the knob D and its shaft 100 should be projected inwardly to the limit, which is that shown in Fig. 9, and then by turning said knob the inner cup 99 will be engaged by the feather 104 and the dollar type-wheel 65 will be engaged by the feather 105, and said cup and its type-wheel may be accurately set by rotating the same until the desired numeral appears at the sight-opening 96, when such movement should be stopped, and said type will be retained in said position by one of the dogs 116 and the cup 99 will be held in position by the frictional contact of one of the hollow spring-bolts 121, resting in one of the depressions 124 in the fixed nipple 101. Then in order to place the type-wheel 66 to print the second or tens figure of the amount the shaft 100 is drawn outward until the spring-pin 110 rests in the second or middle one of the notches 111. The feathers 104 and 105 will of course be withdrawn from their respective keyways in the cup 99 and the type-wheel 65, which will permit said shaft to rotate without disturbing the latter. After thus disengaging the feather from said cup 99 and type-wheel 65 said shaft, together with the cups 98 and 97 and type-wheels 66 and 67, should be rotated until the desired figure appears at the sight-opening 96. The type-wheel 66 will now be in position to print the desired figure and will be held in position by frictional contact of the middle one of the dogs 116, coöperating with one of the notches 117. The cup 98 will be held in position by frictional contact between the spring-bolt 121' and one of the depressions 124' in the bottom of the cup 98. As the cup 99 is only held from rotating by the spring-bolt 121, coöperating with one of the depressions 124, and as the distance from the center of the shaft 100 to the center of the spring-bolt 121 is less than the distance from the center of the shaft to the spring-bolt 121', it follows that if the springs 122 and 122' were of the same power the friction of the spring-bolt 121, coöperating with the nipple 101, would be less than the friction of the spring-bolt 121', coöperating with the depressions in the cup 98. As the cup 99 must be kept from moving while setting the type-wheel 66, it follows that the spring 122 must be of enough greater power to make the friction of the spring-bolt 121, coöperating with a depression 124, somewhat greater than the friction of the spring-bolt 121', coöperating with a depression 124'. In order to set the outer cup 97 and its type-wheel 67, the said shaft should be withdrawn until the spring-pin 110 enters the third and last notch in the shaft 100. Its feathers 104 105 will now be disengaged from said cup 98 and the type-wheel 66 and engage only said outer cup 97 and said type-wheel 67, when the said parts may be readily placed in proper position to print last or units figure of the amount. The period 114 is of course at all times in position for making an impression, as its position is not changed by the rotation of the type-wheels, the lower end of the bar which carries it being, as previously described, mounted upon the transverse shaft 115. Having thus placed the cash-printing wheels in position to print the desired amount, the conductor next grasps the knob B and turns it in the direction indicated by the arrow in Fig. 1, which will turn the gear-wheels 54 and 57 in the directions indicated by the arrows in Fig. 12, and such movement will rotate the eccentric cam 60 and the crank 62 and will elongate its spring 157, one end of which spring is attached to said crank-pin 63, and the opposite end of which is fixed to a pin 158, projecting from the platen-frame 38. Said spring will continue to be elongated until said crank reaches a position directly opposite that in which it is shown in Fig. 3, and when it passes below the center it will be suddenly drawn through the remaining half of a revolution by the contraction of said spring, and this quick movement will momentarily depress the eccentric cam 60 and the platen 64 and cause the platen to make forcible contact with the paper strip beneath it, and thereby cause the type-wheels 65 66 67, as well as the type upon the upper face of the time-printing disks 47 48, to make a record upon the duplicate paper strip. Such downward movement of the platen 64 will also cause the cash type-wheels 65 66 67 to make a record upon the under surface of the original paper strip 4 by reason of the short transverse ink-ribbon 94 being located between the said original strip and the duplicate strip. Nor will the momentary depression of said platen 64 be retarded by the conductor's hand upon said knob B, for the reason that, as previously described, said gear-wheel 54 is connected to its hub 55 by means of a spring-dog 148, which permits independent movement in one direction of said wheel and said knob, so that when said momentary depression of the platen took place said gear-wheels were free to rotate without moving said knob, and the latter would of course remain stationary in the conductor's hand. Then by grasping the knob C and turning the same until the proper station-numbers appear at the sight-opening 95 and then by pushing said knob up and down, its shaft 128 will be vibrated in the slot 137 and the corresponding type carried by the type-wheel 90 will print an impression through the ribbon 86 and make a record upon the duplicate paper strip 8. The stations along the line of railway should be numbered, beginning with "1" and extending from end to end of the line—as, for instance, from St. Louis to Sedalia, Missouri, would be stations Nos. 1 to 54, and the amount of fare five dollars and sixty cents. In order to print a number having more than one figure, it will only be necessary to vibrate the shaft 137 a corresponding number of times, and each time said shaft is vibrated the arm 139 will be vibrated with it, and thereby cause the pawl 141 to engage the teeth of the gear-wheel 25, and thereby actuate the feed-rolls step by step and feed the paper outwardly a corresponding distance. In this manner a station-number having any quantity of figures may be printed. Each time the arm 139 and parts connected therewith are vibrated they will be returned to normal position by means of the spring 144. The pressure will be made upon the under surface of the fixed platen 138. The receipt thus prepared should now be withdrawn from the machine, and this can be accomplished by rotating the feed-rolls 16 and 22, which will cause said receipt to pass outwardly between them and will also draw an additional supply of paper from the roll 5. After passing said feed-rolls the original receipt may be severed by tearing or cutting. The duplicate paper strip 8 will pass downwardly from the feed-roll 16 and be wound upon the roll 17, from which it may be removed by the proper official after the machine has been delivered for inspection at the end of a trip or a series of trips. Inspection of the record may be readily had by removing the roll 17 from its shaft 19 by throwing downwardly the hinged arm 20, which will release said roll and permit the same to be withdrawn from said shaft. After a receipt has passed through the feed-rolls their locking mechanism will prevent the passage of another receipt until the conductor prints the time upon the next succeeding receipt. It will be remembered that the locking mechanism consists of the friction-sector 79 and other devices whereby the said sector will be depressed by friction of the small friction-pulley 29 with the end of said sector, and such depression of said sector will bring its lug 82 into contact with one of the series of the short pins 80, which are arranged about said friction-pulley, and this will of course lock the feed-rolls against further movement until said sector is again elevated. The described downward movement of said sector rocks its shaft 73 and elevates the arm 77 until it occupies a position in the path of the pin 78, carried by said gear-wheel 54. The rotation of said gear-wheel in the direction indicated by the arrow in Fig. 12 during the operation of printing another receipt will cause said pin 78 to pass downwardly upon said arm and depress the same to the normal position, in which it is shown in Figs. 3 and 4, out of the path of the said pin, and such movement will of course rock said shaft 73 and elevate the said sector to its normal position, its frictional surface sliding upon the said friction-pulley without rotating the same. The operation may then be repeated *ad infinitum*, as previously described.

The type-wheel 90, though bearing the station-numbers referred to herein as the station to which the fare is paid, may have the stations distributed thereon in such a manner that when read with relation to the results indicated in the matter of time and fare the said stations will correspond to the stations from which said fare is paid instead of stations to which the fare is paid, so that the possibilities of the present device contemplate this result, as must be obvious to those skilled in the art, and where in the claims the term "station to" or "station or destination to" is employed it is to be understood that it is within the scope of the present invention to cover the station from which the fare is paid as well, the amount in fare recorded by the machine making it possible to ascertain to what point said fare corresponds, and, further, it is to be understood that wherever the words "station to" appear in the claims such claims at the same time contemplate "stations from" so far as the scope of the present invention is concerned.

I claim—

1. In a conductor's cash-fare-receipt register, a suitable casing, means for advancing therein an original record strip or tape and a duplicate strip corresponding thereto, means for simultaneously imprinting the cash fare upon both the original and duplicate, and mechanism for recording the time of said imprint upon the duplicate strip only, substantially as set forth.

2. In a conductor's cash-fare-receipt register, a suitable casing, means for advancing therein an original record strip or tape and a duplicate strip corresponding thereto, means for imprinting the cash fare upon both the original and duplicate, and mechanism for imprinting the station or destination to which said fare corresponds upon said duplicate strip only, substantially as set forth.

3. In a conductor's cash-fare-receipt register, a suitable casing, means for advancing therein an original record strip or tape and a duplicate strip corresponding thereto, means for imprinting the cash fare upon both the original and duplicate, and mechanism for recording the time of said imprint and the station or destination to which said fare corresponds, upon said duplicate strip only, substantially as set forth.

4. In a conductor's cash-fare-receipt register, a suitable casing, means for advancing therein an original record strip or tape and a duplicate strip corresponding thereto, the latter being wholly confined within the casing, means for simultaneously imprinting the cash fare upon both the original and duplicate, and mechanism for recording the time of said imprint upon the duplicate strip only, the original being adapted to be withdrawn from the casing after the record has been impressed thereon, substantially as set forth.

5. A conductor's cash-fare-receipt register, comprising a suitable casing, a roll carrying two strips of paper within said casing, an ink-ribbon extending alongside of one of said strips of paper after it has been withdrawn from said roll, another ink-ribbon of limited width extending across and between said strips of paper, suitable feed-rolls between which said strips pass, a printing or stamping device for inditing upon one strip of paper only the amount of cash fare received from each passenger, means for inditing upon the other strip of paper the time of receipt of cash fare from passengers, and means for inditing the station identification marks upon the last-mentioned strip of paper, substantially as described.

6. In a conductor's cash-fare-receipt register, a suitable casing, means for advancing therein an original and duplicate record strip or tape, the original being adapted to be progressively withdrawn from the casing, an inking-ribbon for the duplicate strip, an inking-ribbon for the original strip disposed at an angle to the first-mentioned ribbon, means for imprinting the cash fare upon both the original and duplicate strips, and mechanism for recording the time of such imprint upon the duplicate strip only, and likewise the station or destination to which said fare corresponds, substantially as set forth.

7. In a conductor's cash-fare-receipt register, a casing, means for advancing, in parallel, an original and a duplicate record-strip, cash-fare-printing wheels which are independently adjustable to set up different amounts in the printing-line, means for making a printing impression upon both of said strips from the same type in the printing-line of the cash-fare-printing wheels, time-printing wheels, for making a printing impression upon one of said strips coincidently with the recording of the amount of the cash fare received, and a time-train for driving said time-printing wheels; substantially as described.

8. In a machine of the character described, the combination with printing-wheels which are independently adjustable to set up characters representing varying amounts in the printing-line, time-printing wheels, a clock-motor for driving said time-printing wheels, means for advancing two strips past the printing-lines of both sets of printing-wheels, and an operating-handle for making a printing impression on both of said strips from said cash-fare-printing wheels and an impression upon only one of said strips from the time-printing wheels; substantially as described.

9. In a machine of the character described, the combination with printing-wheels which are independently adjustable to set up characters representing station-numbers, in the printing-line, time-printing wheels, a clock-motor for driving said time-printing wheels, means for advancing an original record-strip and a parallel duplicate strip past the printing-lines of both sets of printing-wheels, both of said strips being fed together past said printing-wheels, and an operating-handle for making a printing impression on said strips from said printing-wheels; substantially as described.

10. In an apparatus of the character described, the combination with time-printing wheels, a clock-motor for driving the same, independently-adjustable cash-fare-printing wheels, independently-adjustable station-number-printing wheels, means for advancing an original record-strip and a duplicate strip past the printing-lines of all of said printing-wheels, both of said strips being fed together past said printing-wheels, and means for making printing impressions on said strips from said printing-wheels; substantially as described.

11. In a conductor's register, the combination with means for supporting a record-strip, of printing mechanisms for recording cash fares on said strip, printing mechanisms for recording the time on said strip, a clock mechanism in connection with the type-wheels of said last-mentioned printing mechanism, means for making printing impressions on said record-strip, and a printing-wheel for printing the numbers of the stations between which the cash fare recorded on the strip is applicable, the operation of said station-printing wheel operating a line-spacing mechanism for feeding the record-strip; substantially as described.

12. In a conductors's cash-fare register, the combination with printing-wheels, means for operating said printing-wheels to set up the amount of fare received in the printing-line, printing-wheels located adjacent to said first-mentioned printing-wheels, clock mechanism for driving the last-mentioned printing-wheels, a platen, means for initially moving said platen to make a printing impression, and means which are effective after said initial movement, for moving the platen to and from contact with the printing-type; substantially as described.

13. In a conductor's register, the combination with two sets of printing-wheels, one of said sets being driven by a clock mechanism, and the other manually adjusted to indicate the amount of fare received, means for supporting a record-strip, a printing-platen, a cam for operating said platen, and means whereby the initial rotation of said cam will not effect a printing impression, said cam being caused to complete its rotative movement independently of the control of the operator so as to instantly make the printing impression and raise the platen from the printing-type after the printing impression is made; substantially as described.

14. In a conductor's register, the combination with printing-type, of a platen having a reciprocatory movement, a cam for vibrating said platen, a drive-wheel for said cam, and a pawl-and-ratchet connection coöperating with said drive-wheel whereby a portion of the revolution of the cam is independent of the control of the operator; substantially as described.

15. In a conductor's register, the combination with printing-type, of a reciprocatory platen for making the printing impression from said type, a cam for reciprocating said platen, a gear carrying said cam, the second gear in mesh with the first-mentioned gear, an operating-handle, and a pawl-and-ratchet mechanism interposed between the operating-handle and said second gear; substantially as described.

16. In a conductor's register, the combination with printing-type, of a platen for making a printing impression therefrom, a cam for operating said platen, a spring connected to said cam for holding the platen in an elevated position, and a ratchet-and-pawl mechanism for partially rotating said cam and placing said spring under tension so that the spring will make a printing impression; substantially as described.

17. In a conductor's register, the combination with printing-type, of a reciprocatory platen, a cam for operating said platen, a crank-arm connected to said cam, a spring connected to said crank-arm, and a ratchet-and-pawl mechanism for driving said cam and crank-arm around until the crank-arm passes the position of dead-centers whereby the power stored in said spring will act to move the crank-arm and cam to complete the rotative movement thereof and effect an instantaneous printing impression; substantially as described.

18. In a conductor's register, the combination with printing-type, of a platen-actuating mechanism, a paper-feed roll, means for locking the paper-feed roll after a limited peripheral distance has been traversed, and means operated by the platen-actuating mechanism for releasing the paper-feed roll; substantially as described.

19. In a conductor's register, the combination with printing-type, a platen, platen-actuating mechanism comprising a gear with a projection thereon, a paper-feed roll, and a lock coöperating with said paper-feed roll, said lock having a tailpiece which is located in the path of said projection when the feed-roll is locked, whereby the operation of the platen-actuating mechanism will operate said lock to release the paper-feed roll; substantially as described.

20. In a conductor's register, the combination of a paper-feed roll having a friction-pulley at one end, locking projections adjacent said friction-pulley, a locking-plate in engagement with said friction-pulley and provided with a complementary locking projection designed to coöperate with the locking projections on the paper-feed roll, and means for moving said locking-plate out of locking position; substantially as described.

21. In a conductor's register, the combination of a paper-feed roll, means for supporting a record-strip, a friction-pulley on the end of said paper-feed roll, locking projections also carried by said paper-feed roll, a locking-plate in frictional engagement with said pulley, said plate having a complementary locking projection to arrest the movement of the feed-roll, printing mechanism for making the printing impression on the record-strip, and means whereby upon the actuation of said printing mechanism said locking-plate is operated to release the paper-feed roll; substantially as described.

22. In a conductor's register, the combination of means for supporting a record-strip, of a printing-wheel for printing the numbers of stations on said record-strip, a shaft upon which said printing-wheel is mounted, a universal coupling for supporting one end of said shaft, and an operating-handle on the other end of said shaft for moving the same to cause its carried printing-wheel to make a printing impression on the record-strip; substantially as described.

23. In a conductor's register, the combination with nested indicator-wheels, a shaft capable of longitudinal and rotary motion, said shaft having a projection designed to engage and successively operate the said indicator-wheels, printing-wheels mounted on said shaft, and a complementary projection on said shaft for engaging and operating the printing-wheels corresponding to the position occupied by the indicator-wheels; substantially as described.

24. In a conductor's register, the combination with nested cup-shaped indicator-wheels, of spring-pressed devices for holding them in adjusted positions, a shaft capable of longitudinal and rotary movement and provided with a projection for separately operating said disks, printing-wheels mounted on said shaft, and a complementary projection on the shaft for engaging and operating the printing-wheels to correspond with the positions of their respective disks; substantially as described.

25. In a conductor's register, the combination with two sets of printing-type, one for impressing the cash fares on the record-strip and the other for impressing the time upon said record-strip, a platen for making a printing impression from said type, an independently-operable printing-wheel for printing the numbers of the stations between which the cash fare recorded is applicable, a receiving-spool for the record-strip, and means operated by the last-mentioned printing mechanism for driving said receiving-spool to wind up the record-strip; substantially as described.

26. In a conductor's register, the combination with cash-fare-printing wheels, time-printing wheels, a platen for making a printing impression on said wheels, means for supporting a permanent record-strip, means for printing the numbers of the stations on said permanent record-strip between which stations the cash fare paid is applicable, means operated by the last-mentioned printing mechanism for winding up the record-strip, means for supporting a second record-strip which is issued from the machine, a paper-feed roll therefor, and means for locking said paper-feed roll against movement after a predetermined length of said record-strip is paid out by the machine; substantially as described.

In testimony whereof I have signed my name to this specification in presence of two subscribing witnesses.

WILLIAM W. KAY.

Witnesses:
   ALFRED A. EICKS,
   JOHN C. HIGDON.